US008633897B2

(12) United States Patent
Endo

(10) Patent No.: US 8,633,897 B2
(45) Date of Patent: Jan. 21, 2014

(54) TOUCH PANEL HAVING CURVED SURFACE AND MANUFACTURING PROCESS

(75) Inventor: Michiko Endo, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 892 days.

(21) Appl. No.: 11/785,092

(22) Filed: Apr. 13, 2007

(65) Prior Publication Data

US 2008/0042997 A1 Feb. 21, 2008

(30) Foreign Application Priority Data

Aug. 21, 2006 (JP) ................................. 2006-224083

(51) Int. Cl.
*G06F 3/041* (2006.01)
(52) U.S. Cl.
USPC .......................................... 345/173; 345/174
(58) Field of Classification Search
USPC ................................. 345/173, 174
See application file for complete search history.

(56) References Cited

U.S. PATENT DOCUMENTS

| | | | |
|---|---|---|---|
| 5,541,370 A * | 7/1996 | Matsuda et al. | 178/18.05 |
| 5,543,588 A * | 8/1996 | Bisset et al. | 178/18.06 |
| 6,750,852 B2 * | 6/2004 | Gillespie et al. | 345/173 |
| 7,161,639 B2 * | 1/2007 | Nishiyama et al. | 349/12 |
| 7,439,962 B2 * | 10/2008 | Reynolds et al. | 345/173 |
| 2005/0030294 A1 * | 2/2005 | Ahn et al. | 345/173 |
| 2005/0118922 A1 | 6/2005 | Endo | |
| 2005/0212773 A1 * | 9/2005 | Asbill | 345/173 |
| 2006/0103632 A1 * | 5/2006 | Bourdelais et al. | 345/173 |

FOREIGN PATENT DOCUMENTS

| | | |
|---|---|---|
| JP | 61-163520 | 7/1986 |
| JP | 7-501640 | 2/1995 |
| JP | 07-084705 | 3/1995 |
| JP | 3048333 | 2/1998 |
| JP | 10-268245 | 10/1998 |
| JP | 11-24827 | 1/1999 |
| JP | 2005-182737 | 7/2005 |
| WO | WO 93/11518 | 6/1993 |

OTHER PUBLICATIONS

Mizutani, M. et al. "Resistive Type of Transparent Touch-panel" Fujikura Technical Report No. 102. pp. 42-46.
Office Action mailed issued by the Japanese Patent Office in the corresponding Japanese patent application No. 2006-224083, (2006).

* cited by examiner

*Primary Examiner* — Alexander S Beck
*Assistant Examiner* — Jeffrey Steinberg
(74) *Attorney, Agent, or Firm* — Staas & Halsey LLP

(57) ABSTRACT

The present invention is directed to the provision of a touch panel having a curved shape and its manufacturing process; for this purpose, the touch panel having a curved shape comprises an upper film substrate and a lower film substrate, each formed from a transparent plastic film having a transparent electrically conductive polymer layer, an electrode, and a wiring pattern formed thereon.

6 Claims, 6 Drawing Sheets

TOUCH PANEL HAVING CURVED SURFACE AND MANUFACTURING PROCESS

FIELD OF THE INVENTION

The present invention relates to a resistive film type touch panel, and more particularly, to a touch panel having a polarizing plate coated with a transparent electrically conductive polymer.

BACKGROUND OF THE INVENTION

Many types of touch panels are known and they include the resistive film type (analog resistive film type), the ultrasonic surface acoustic wave type, the infrared interruption type, the capacitive type, the electromagnetic induction type, and the image recognition type. Each type has its own advantages. Of these types, the present invention employs the resistive film type. Due to its simple structure, simple circuit connections, and low cost, the resistive film type is widely used for touch panels. In fact, the majority of currently commercialized touch panels are based on this type.

FIG. 6 shows a cross section showing the structure of a prior known resistive film type touch panel. In the figure, reference numeral 1 is the touch panel, 2 is a PET film, 3 is an upper ITO (Indium Tin Oxide) electrode, 4 is a glass substrate, 5 is a dot spacer, 6 is a lower ITO electrode, 7 is a double-sided adhesive tape, and 8 is a polarizing plate. Touch panel 1 comprises the glass substrate 4, the ITO electrode 6 formed on the glass substrate, the dot spacers 5 formed on the electrode, the PET sheet film 2 as an upper flexible substrate about 200 μm in thickness, and the polarizing plate 8 and ITO electrode 3 sandwiching the PET film therebetween. Spacers 5 are formed from an insulating material such as acrylate, urethane, or the like; the diameter of each dot spacer 5 is, for example, 50 μm, and the height is, for example, 5 μm to 6 μm. ITO electrodes 3 and 6 are transparent electrodes, and are formed over the entire area of the panel, i.e., over the lower surface of the PET film 2 and the upper surface of the glass substrate 4, respectively.

FIG. 6 shows the resistive film type panel in a condition in which the panel surface is not pressed with a finger or a pen tip. In this condition, no current flows between the ITO electrodes 3 and 6, because the electrodes are separated by the spacers 5. FIG. 7 is a schematic cross-sectional view of the resistive film type panel showing a condition in which the film surface is touched with a finger (or pen tip). In the figure, the pressing force causes the ITO electrodes 3 and 6 on the PET film 2 and the glass 4 to contact each other, and a current flows. When the film surface is touched, the resistive voltage dividing ratio is measured on each of the ITO electrodes 3 and 6 on the glass surface and the film surface, respectively, and the pressed position is thus calculated. This basic technology is described, for example, in Fujikura Technical Report, No. 102, April 2002, pp. 42-46, or in Japanese Unexamined Patent Publication No. H07-84705.

FIG. 8 shows the principle of how the coordinate point (X, Y) of a touch is calculated. FIG. 8(a) is a schematic diagram showing how the X coordinate is detected. Voltage Vcc is applied in the X direction on the upper film 2, and the resulting voltage is detected on the lower glass to calculate the X coordinate. Likewise, FIG. 8(b) is a schematic diagram showing how the Y coordinate is detected. Voltage Vcc is applied in the Y direction on the lower glass, and the resulting voltage is measured on the upper film to calculate the Y coordinate.

Currently commercialized touch panels are flat panels. However, in the fields of operation panels for game machines, automobiles and input/output devices for personal computers for which aesthetic appearance matters, there is a demand for a touch panel having a curved surface. As one example of a touch panel having a curved surface, there is disclosed, for example, in Japanese Unexamined Patent Publication No. 2005-182737 or in Japanese Utility Model Registration No. 3048333, a touch panel in which the same transparent resin film as that used for the upper substrate is also used for the lower substrate, thereby making the entire structure of the touch panel flexible so that the panel can, for example, be curved so as to conform with the surface on which it is mounted.

SUMMARY OF THE INVENTION

It is an object of the present invention to provide a touch panel having a curved shape and a manufacturing process.

The present invention has been devised to solve the above technical problem, and provides the following configuration.

According to a first mode of the present invention, there is provided a resistive film type touch panel which comprises an upper film substrate and a lower film substrate, each formed from a transparent plastic film having a transparent electrically conductive polymer layer, an electrode, and a wiring pattern formed thereon, wherein the touch panel has an operation surface formed in a curved shape. According to a second mode of the present invention, dot spacers are formed at a pitch of 1 mm or less in the resistive film type touch panel of the first mode of the present invention while, according to a third mode of the present invention, in the resistive film type touch panel of the first mode of the present invention, dot spacers in a center portion of the panel are formed at a finer pitch than dot spacers formed outside the center portion. Further, according to a fourth mode of the present invention, in the resistive film type touch panel of the first mode of the present invention, the dot spacers in the center portion of the panel are formed with a height greater than the height of the dot spacers formed outside the center portion. According to claim 5 of the present invention, there is provided a manufacturing process for a resistive film type touch panel having an operation surface formed in a curved shape, comprising the steps of: forming a flat-plate upper substrate and a flat-plate lower substrate from a transparent plastic substrate; constructing a flat-plate touch panel from the upper and lower substrates; and forming the flat-plate touch panel into a curved shape by pressing.

Since the panel of the present invention can be formed in a curved shape to conform to the shape of the apparatus used, the panel can be used as a new type of touch panel that can be mounted on a portion where conventional touch panels cannot be mounted, or as a new type of touch panel for an input device where attractive design and aesthetic appearance are important factors. Further, the panel of the present invention offers the advantageous effect of simplifying the manufacturing process and reducing cost. That is, while the prior art process that uses ITO films always requires that the electrode pattern printing step be preceded by an insulating pattern printing step or an ITO film etching step in order to process the unwanted portions of the ITO films, the present invention can omit the step of processing the unwanted portions of the ITO films because, as can be seen from the manufacturing process described above, the electrically conductive patterns are formed only on necessary portions. Accordingly, the manufacturing process can be greatly simplified, and cost can be further reduced.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Figure 1:
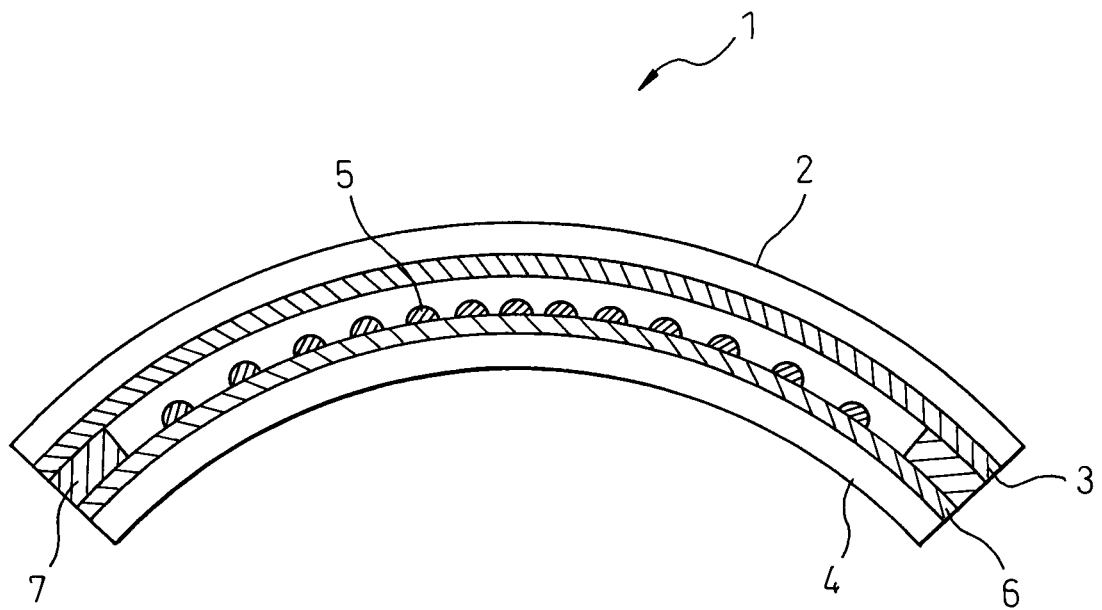
FIG. 1 is a cross-sectional view of a panel having a curved shape according to the present invention.

Embodiments of the present invention will be described below. FIG. 1 is a schematic diagram showing a cross section of a resistive film type touch panel according to a first embodiment of the present invention. In the figure, reference numeral 1 is the touch panel, 2 is an upper transparent plastic sheet, 3 and 6 are transparent electrically conductive polymer films, 4 is a lower transparent plastic sheet, 5 is a dot spacer, and 7 is a double-sided adhesive tape. The panel has a curved shape, and comprises a lower substrate constructed by depositing the transparent electrically conductive polymer film 6 on the lower transparent sheet 4 and forming the dot spacers 5 on top thereof, and an upper substrate constructed by depositing the transparent electrically conductive polymer film 3 on the upper transparent sheet, the two substrates being bonded together in an integral fashion by the double-sided adhesive tape. The feature of this embodiment lies in the fact that the lower substrate is constructed from the transparent resin sheet 4, not a glass substrate, and that the transparent electrode films on the upper and lower substrates are formed from the transparent electrically conductive polymer films 3 and 6, respectively.

Figure 2:
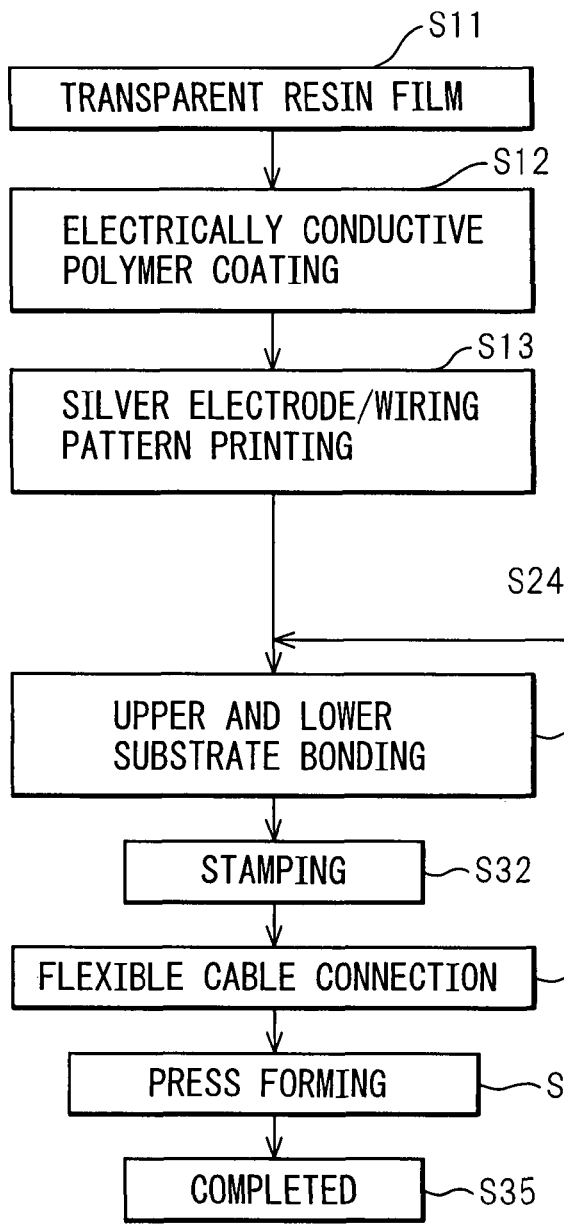
FIG. 2 is a flowchart showing a panel manufacturing process according to the present invention.

FIG. 2 shows an outline of a manufacturing process flow for the resistive film type touch panel having the curved shape shown in FIG. 1. The first stage of the manufacturing process flow is separated into two flows, an upper substrate formation flow and a lower substrate formation flow. The upper and lower substrates are basically the same in structure, but as the dot spacers and an insulating layer are formed on the lower substrate, the difference between the two flows is whether the dot spacer/insulating layer formation step is included or not.

In the flow diagram of FIG. 2, first the transparent resin film is cut to a size suitable for working (work size) for each of the upper and lower substrates (steps S11 and S21), and then annealing is performed to remove the slack and twist in the film. The transparent film used here is formed, for example, from PET, polycarbonate, cycloolefin, or like material. Next, using such means as a spray coater or screen printing, a solution prepared by dispersing a transparent electrically conductive polymer material therein is applied over designated areas on the respective transparent resin films 2 and 4 to form patterns thereon, and the resulting films are then dried by heating, thus forming the transparent electrically conductive polymer films (steps S12 and S22).

Here, in the upper substrate formation flow, after forming the transparent electrically conductive polymer film 3, the conductive pattern is formed to form the electrode (step S13), while in the lower substrate formation flow, the dot spacers 5 are first formed on the transparent electrically conductive polymer film 6, and then the conductive pattern is formed to form the electrode (step S23) and, on top of that, an insulating layer is formed to prevent short-circuiting between the conductive pattern and the upper substrate (step S24). Here, the upper substrate refers to the entire structure of the upper film 2 having the transparent electrically conductive polymer film 3 and the conductive pattern formed thereon, while the lower substrate refers to the entire structure of the lower film 4 having the transparent electrically conductive polymer film 6, the conductive pattern, and the dot spacers 5 formed thereon.

The formation of the upper and lower substrates is thus completed. After that, the upper and lower substrates are held together so that the transparent electrically conductive polymer film 3 formed on the upper substrate faces the transparent electrically conductive polymer film 6 formed on the lower substrate, and the two substrates are bonded together along their outer edges by means of the double-sided adhesive tape 7 which also serves as a spacer (step S31).

Next, the upper and lower substrates thus bonded together are stamped into a prescribed finished size (step S32). Then, an FPC (Flexible Printed Circuit board) or a flexible cable is connected to the electrodes formed by the conductive patterns on the respective films, to complete the fabrication of the resistive film type touch panel (step S33). When this touch panel is formed by pressing as will be described later, the touch panel having a curved shape is completed (step S34).

As an alternative manufacturing process, the upper and lower films may be formed from a single mother film. More specifically, a solution is applied by pattern printing on a portion corresponding to the upper film and a portion corresponding to the lower film on the single transparent resin film cut to the work size, and the solution is dried by heating, thus forming a transparent electrically conductive polymer film.

Then, after forming the dot spacers on the portion corresponding to the lower film, the part consisting of the upper and lower film portions and a joining portion joining them together is stamped out of the resin film. The thus stamped-out part is then bent along the joining portion, and with the upper and lower film portions held facing each other, the upper and lower films are bonded together along their outer edges.

Next, the press forming in the above steps 34 will be described.

Figure 3:
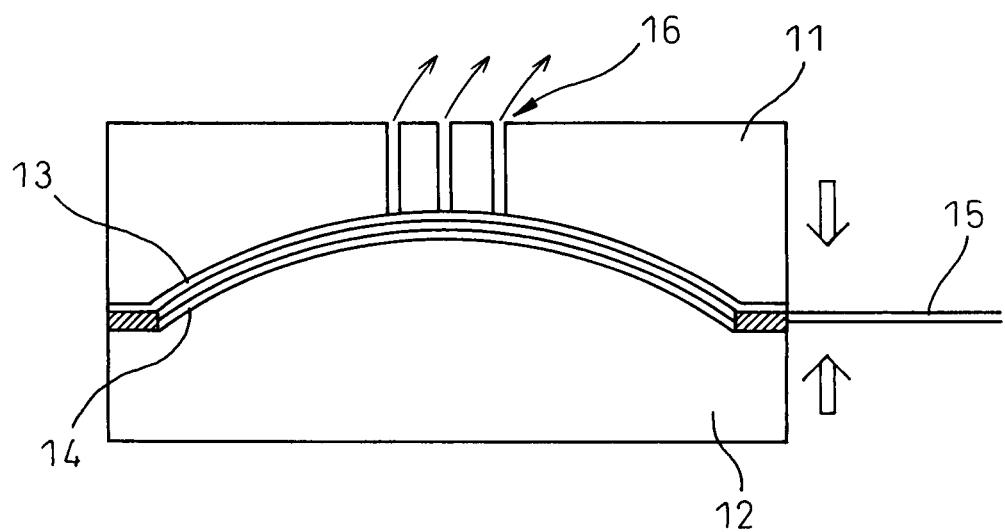
FIG. 3 is a cross-sectional view showing press die portions of a press machine for fabricating the touch panel having a curved shape according to the present invention.

FIG. 3 is a cross-sectional view of a press machine. Reference numeral 11 is an upper press die, 12 is a lower press die, 13 is the upper substrate having the electrically conductive polymer film and the electrode conductive pattern formed thereon, 14 is the lower substrate having the electrically conductive polymer film and the electrode conductive pattern formed thereon, 15 is the flexible cable, and 16 is an evacuation hole.

The press machine having the upper press die 11 and lower press die 12 curved as shown in FIG. 3 is used for the press forming. The touch panel comprising the upper and lower substrates fabricated in the above-described process is placed between the upper and lower press dies of the press machine, and pressed for a few minutes under a temperature of about 200° C. At this time, in order to prevent short-circuiting of the upper and lower films, the upper and lower films should be held a certain distance apart from each other by clamping the upper film onto the mold by a vacuum produced by evacuating through the plurality of holes 16 formed in the upper press die 11. The thus produced panel is solidified and thus retained in the curved shape.

Alternatively, a panel having such a curved shape may be produced by first forming the upper and lower substrates separately into the same curved shape and then bonding them together.

(Dot Spacers)

Figure 4:
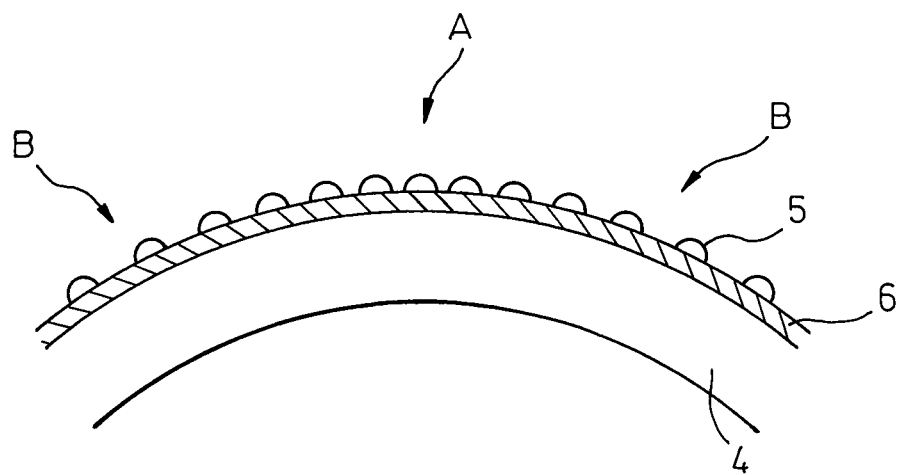
FIG. 4 is a cross-sectional view of a lower substrate, illustrating how the dot spacer pitch is varied in the panel according to the present invention.

The dot spacers in the center portion of the panel should be formed at a finer pitch than the dot spacers outside the center portion in order to prevent the upper and lower substrate from short-circuiting when the panel is formed into the curved shape. FIG. 4 shows one example in which the dot spacers 5 are formed on the lower substrate comprising the lower film 4 with the transparent electrically conductive polymer film 6 formed thereon. As shown, the dot spacers 5 in the curved center portion A of the curved panel are formed at a finer pitch than those in the curved outer edge portion B of the panel. In the case of a cylindrically shaped panel, the dot spacer pitch is varied in the direction of the curvature, as just described, but the dot spacers are evenly spaced apart in the longitudinal direction of the cylinder. In the case of a flat panel, the dot spacers are usually formed at a pitch of about 2 mm to 2.6 mm, but in the case of a curved panel, the dot spacers must be formed at a pitch of 1 mm or less. According to the results of the experiment conducted by the present inventors, it has been found that, if the dot spacer pitch is larger than 1 mm, there is a possibility of short circuiting between the upper and lower substrates.

Figure 5:
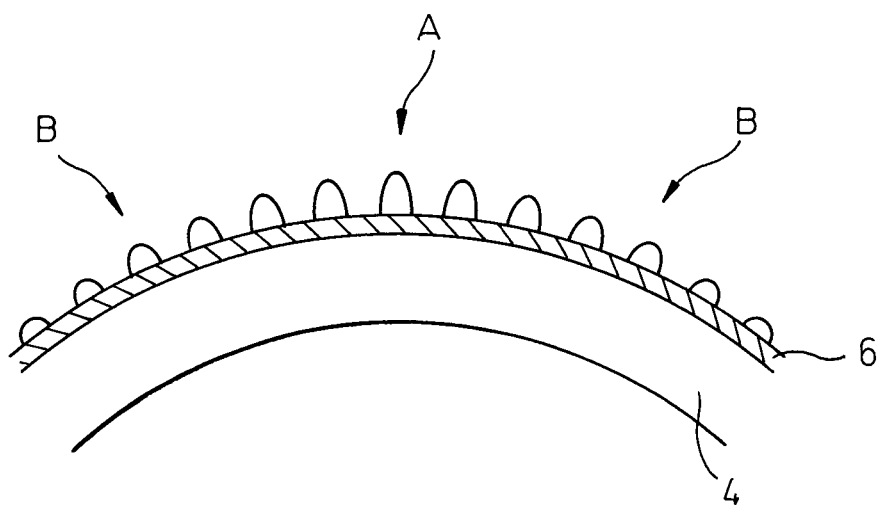
FIG. 5 is a cross-sectional view of a lower substrate, illustrating how the dot spacer height is varied in the panel according to the present invention.
Figure 6:
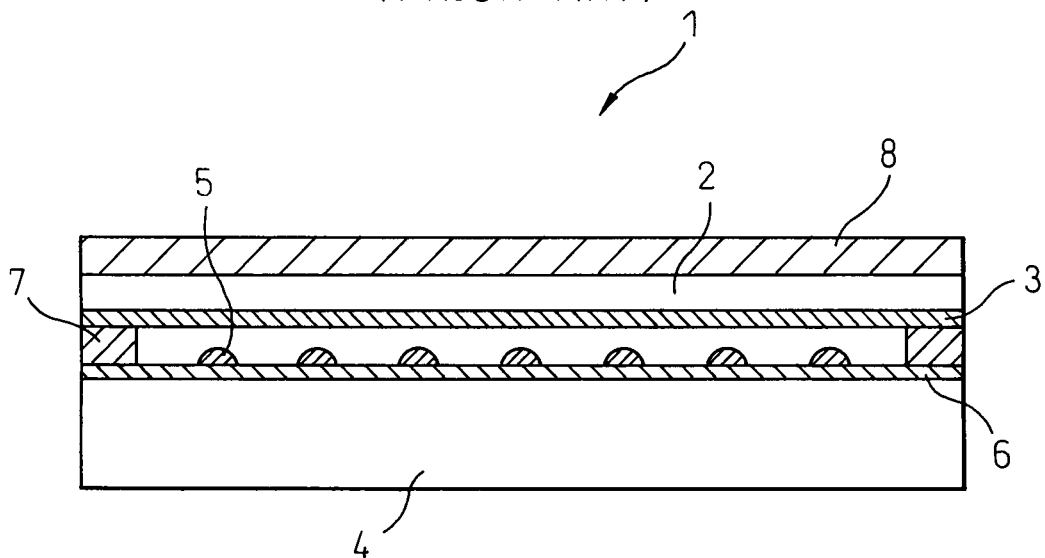
FIG. 6 is a schematic cross-sectional view of a prior art resistive film type touch panel.
Figure 7:
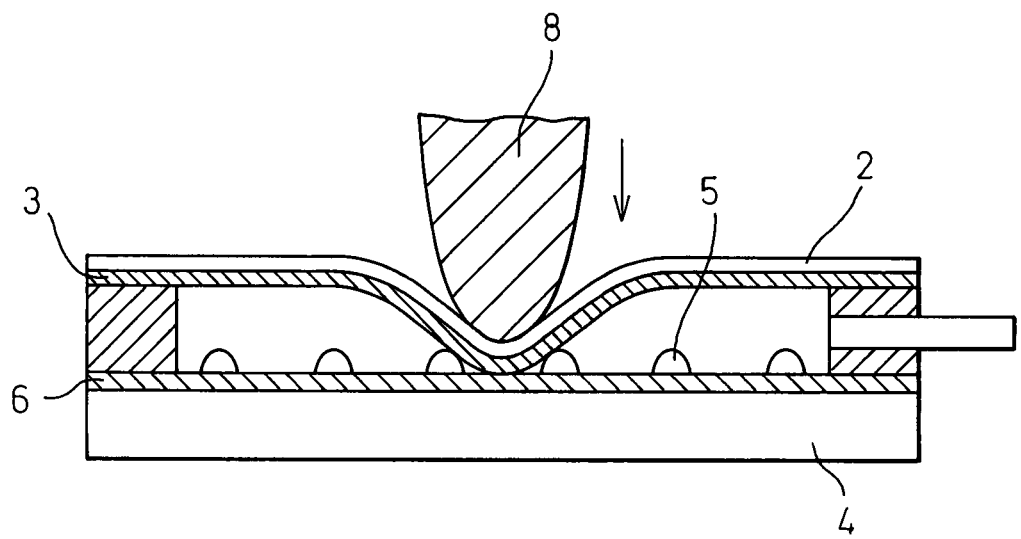
FIG. 7 is a schematic cross-sectional view showing a condition in which the prior art touch panel is pressed with a finger.
Figure 8:
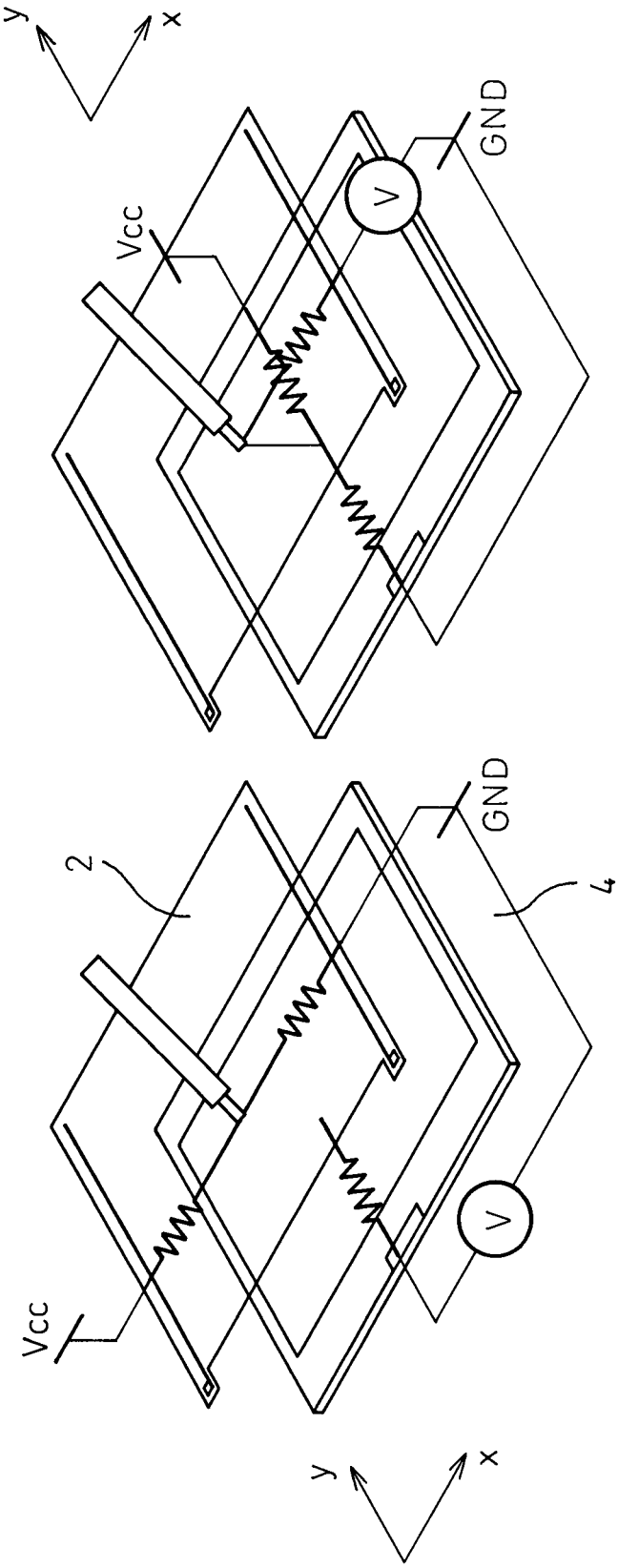
FIG. 8 is a diagram for explaining the principle of how the pressed point is detected in the resistive film type touch panel.

FIG. 5 shows an example of a structure in which the height of the dot spacers 5 in the center portion of the panel is increased compared with the height of the dot spacers 5 outside the center portion. This structure also serves to prevent short circuiting between the upper and lower substrates.

The dot spacers may be formed on either the upper film or the lower film or on both films.

Although the above embodiments have been described as exemplary embodiments of the invention, it should be understood that additional modifications, substitutions, and changes may be made to the above panel without departing from the scope of the invention as disclosed herein. Accordingly, the scope of the invention is by no means restricted by the specific embodiments described herein, but should be defined by the appended claims and their equivalents.

The invention claimed is:

1. A resistive film type touch panel comprising:
   an upper film substrate and a lower film substrate, each formed from a transparent plastic film having a transparent electrically conductive polymer layer, an electrode, and a wiring pattern formed thereon; and
   dot spacers formed on the lower film substrate so as to face the upper film substrate;
   wherein each of the upper film substrate, the lower film substrate, and the respective electrically conductive polymer layers are formed in a curved shape so that said touch panel has an operation surface formed in a curved shape with respect to at least two directions of the operation surface, and
   wherein dot spacers in a center portion of said panel are formed with a height greater than a height of dot spacers formed outside the center portion.

2. A resistive film type touch panel as claimed in claim 1, wherein dot spacers are formed at a pitch of 1 mm or less.

3. A resistive film type touch panel as claimed in claim 1, wherein dot spacers in a center portion of said panel are formed at a finer pitch than dot spacers formed outside the center portion.

4. A manufacturing process for a resistive film type touch panel having an operation surface formed in a curved shape, comprising the steps of:
   forming a flat-plate upper substrate and a flat-plate lower substrate from a transparent plastic substrate;
   forming an electrically conductive polymer layer on each of the flat-plate upper substrate and a flat-plate lower substrate;
   forming dot spacers on the flat-plate lower substrate so as to face the flat-plate upper substrate, dot spacers in a center portion of said panel being formed with a height greater than a height of dot spacers formed outside the center portion;
   constructing a flat-plate touch panel from said upper and lower substrates; and
   forming said flat-plate touch panel into a curved shape by pressing such that each of the flat-plate upper substrate, flat-plate lower substrate, and the respective electrically conductive polymer layers are formed in a curved shape so that the operation surface is formed in a curved shape with respect to at least two directions of the operation surface.

5. A resistive film type touch panel as claimed in claim 1, wherein the at least two directions are at least two dimensions in a rectangular coordinate system of the operation surface.

6. A manufacturing process as claimed in claim 4, wherein the at least two directions are at least two dimensions in a rectangular coordinate system of the operation surface.

\* \* \* \* \*